US008443785B2

(12) United States Patent
Carter

(10) Patent No.: US 8,443,785 B2
(45) Date of Patent: May 21, 2013

(54) LIQUEFIED PETROLEUM GAS (LPG) PUMP CONTROL SYSTEMS AND METHODS

(75) Inventor: Nicholas Carter, Fairfield (AU)

(73) Assignee: GM Global Technology Operations LLC

( * ) Notice: Subject to any disclaimer, the term of this patent is extended or adjusted under 35 U.S.C. 154(b) by 337 days.

(21) Appl. No.: 12/879,128

(22) Filed: Sep. 10, 2010

(65) Prior Publication Data

US 2012/0060796 A1    Mar. 15, 2012

(51) Int. Cl.
*F02M 37/08*    (2006.01)

(52) U.S. Cl.
USPC ............ 123/497; 123/457; 123/525; 701/104

(58) Field of Classification Search
USPC ................. 123/1 A, 457–465, 502, 510–512, 123/525–527; 73/114.38, 114.43; 701/102–104
See application file for complete search history.

(56) References Cited

U.S. PATENT DOCUMENTS

| 6,748,931 | B2* | 6/2004 | Ricco | 123/527 |
| 6,766,269 | B2* | 7/2004 | Lee | 702/136 |
| 7,004,147 | B2* | 2/2006 | Kang | 123/479 |
| 7,191,772 | B2* | 3/2007 | Robitschko et al. | 123/674 |
| 7,373,932 | B2* | 5/2008 | Hayashi et al. | 123/549 |
| 7,377,253 | B2* | 5/2008 | Washeleski et al. | 123/198 D |
| 2004/0099249 | A1* | 5/2004 | Lee | 123/464 |
| 2004/0206338 | A1* | 10/2004 | Pursifull et al. | 123/510 |
| 2004/0250795 | A1* | 12/2004 | Stroia et al. | 123/447 |
| 2009/0159057 | A1* | 6/2009 | Pursifull et al. | 123/575 |
| 2009/0187327 | A1* | 7/2009 | Grant et al. | 701/103 |

* cited by examiner

*Primary Examiner* — Stephen K Cronin
*Assistant Examiner* — Joseph Dallo

(57) ABSTRACT

A control system for a liquefied petroleum gas (LPG) vehicle, includes a composition determination module and a pump control module. The composition determination module determines a composition of LPG in an LPG tank of the LPG vehicle based on an LPG tank pressure and a temperature of the LPG in the LPG tank. The pump control module controls operation of an LPG pump based on the composition.

18 Claims, 4 Drawing Sheets

LIQUEFIED PETROLEUM GAS (LPG) PUMP CONTROL SYSTEMS AND METHODS

FIELD

The present disclosure relates to internal combustion engines and more particularly to liquefied petroleum gas (LPG) vehicle control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines may be regulated via a throttle. The throttle may adjust throttle area, which increases or decreases air flow into the engine. As the throttle area increases, the air flow into the engine increases.

A fuel control system controls the rate that liquefied petroleum gas (LPG) is supplied to the engine to provide a desired air/LPG mixture to the cylinders. Increasing the amount of air and LPG provided to the cylinders generally increases the torque output of the engine.

Before being provided to the engine, the LPG is stored in an LPG tank. An LPG pump draws LPG from the LPG tank and pressurizes the LPG in a fuel rail. Fuel injectors provide LPG to the engine from the fuel rail. In some engine systems, the LPG pump operates at a maximum duty cycle (DC) at all times during vehicle operation to ensure that the LPG is sufficiently pressurized in the fuel rail to maintain the LPG in the liquid form.

SUMMARY

A control system for a liquefied petroleum gas (LPG) vehicle, includes a composition determination module and a pump control module. The composition determination module determines a composition of LPG in an LPG tank of the LPG vehicle based on an LPG tank pressure and a temperature of the LPG in the LPG tank. The pump control module controls operation of an LPG pump based on the composition.

A control method for a liquefied petroleum gas (LPG) vehicle, includes: determining a composition of LPG in an LPG tank of the LPG vehicle based on an LPG tank pressure and a temperature of the LPG in the LPG tank; and controlling operation of an LPG pump based on the composition.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
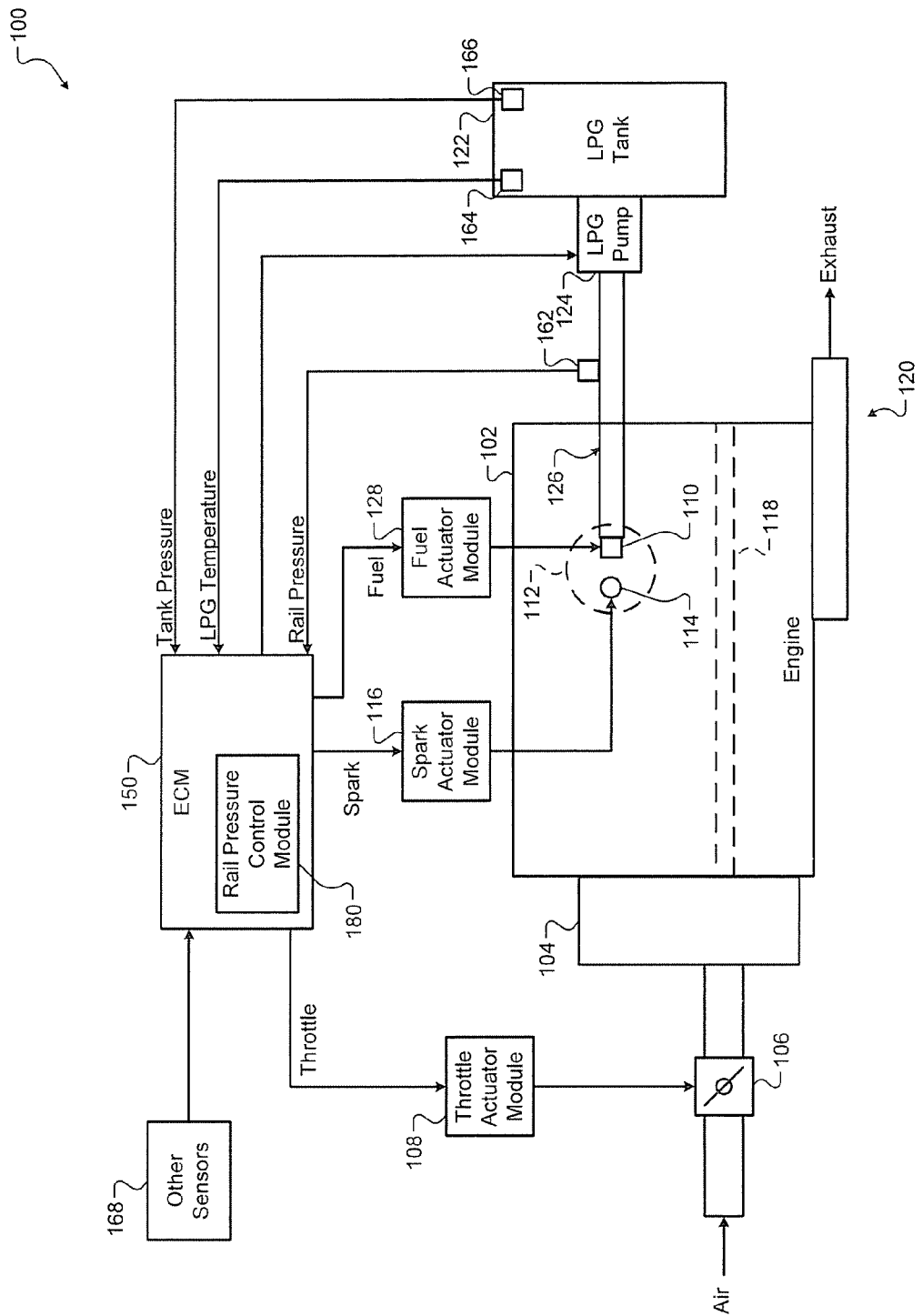
FIG. 1 is a functional block diagram of an exemplary engine system of a liquefied petroleum gas (LPG) vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

A fuel system supplies liquid petroleum gas (LPG) to an engine for combustion. An LPG pump draws LPG from an LPG tank and provides LPG in liquid form to the engine via a fuel rail. Fuel injectors supply LPG from the fuel rail to the engine. A rail pressure control module controls the LPG pump.

The rail pressure control module of the present disclosure determines a composition of the LPG in the LPG tank based on pressure within the LPG tank and temperature of the (liquid) LPG in the LPG tank. The rail pressure control module determines a minimum rail pressure to maintain the LPG in liquid form in the fuel rail based on the composition. The rail pressure control module determines a target rail pressure based on the minimum rail pressure. The rail pressure control module controls duty cycle (DC) at which the LPG pump operates based on the target rail pressure.

Referring now to FIG. 1, a functional block diagram of an exemplary engine system 100 of a liquefied petroleum gas (LPG) vehicle is presented. The engine system 100 may take another suitable form of fuel consumer. Air is drawn into an engine 102 through an intake manifold 104. A throttle valve 106 may be actuated by a throttle actuator module 108 to vary airflow into the engine 102. The throttle actuator module 108 may include, for example, an electronic throttle controller (ETC). The air mixes with LPG injected by one or more fuel injectors, such as fuel injector 110, to form an air/LPG mixture. The air/LPG mixture is combusted within one or more cylinders of the engine 102, such as cylinder 112.

A spark plug 114 may initiate combustion of the air/LPG mixture within the cylinder 112. A spark actuator module 116 controls the provision of spark by the spark plug 114. Although one fuel injector, spark plug, and cylinder are shown, the engine 102 may include more or fewer fuel injectors, spark plugs, and cylinders. For example only, the engine 102 may include 2, 3, 4, 5, 6, 8, 10, or 12 cylinders. A fuel injector and a spark plug may be provided for each cylinder of the engine 102. Drive torque generated by combustion of the air/LPG mixture is output from the engine 102 via a crankshaft 118. Exhaust gas resulting from combustion is expelled from the engine 102 to an exhaust system 120.

Before being provided to the engine 102, the LPG is stored in an LPG tank 122. An LPG pump 124 draws fuel from the LPG tank 122. The LPG pump 124 pressurizes the LPG within a fuel rail 126. The fuel rail 126 supplies pressurized LPG to the fuel injector 110. A fuel actuator module 128 controls opening of the fuel injector 110 based on signals from an engine control module (ECM) 150. In this manner, the ECM 150 controls the timing of LPG injection and the amount of LPG injected by the fuel injector 110. The ECM 150 also controls other engine actuators, such as the throttle actuator module 108 and the spark actuator module 116.

One or more sensors may be implemented in the engine system 100. For example only, the engine system 100 includes a rail pressure sensor 162, a tank pressure sensor 164, and an LPG temperature sensor 166. The rail pressure sensor 162 measures pressure within the fuel rail 126 (i.e., rail pressure) and generates a rail pressure signal based on the rail pressure. The tank pressure sensor 164 measures pressure within the LPG tank 122 (i.e., tank pressure) and generates a tank pressure signal based on the tank pressure. The LPG temperature sensor 166 measures temperature of the (liquid) LPG in the LPG tank 122 (i.e., LPG temperature) and generates an LPG temperature signal based on the LPG temperature. The engine system 100 may also include other sensors 168, such as a mass air flowrate (MAF) sensor, a manifold absolute pressure (MAP) sensor, an intake air temperature (IAT) sensor, an engine speed sensor, and other suitable sensors.

The ECM 150 controls whether the LPG pump 124 is operational (i.e., ON or OFF). The ECM 150 includes a rail pressure control module 180 that controls the rail pressure via the LPG pump 124 when the LPG pump 124 is operational. More specifically, the rail pressure control module 180 controls a duty cycle (DC) at which the LPG pump 124 operates. The DC corresponds to how much pumping (i.e., pumping LPG to the fuel rail 126) the LPG pump 124 performs. Generally, the LPG pump 124 pumps more LPG to the fuel rail 126 as the DC increases.

The rail pressure control module 180 of the present disclosure determines a composition of the LPG (fuel) that is in the LPG tank 122 based on the LPG temperature and the tank pressure. The composition corresponds to how much (e.g., a percentage) of the LPG in the LPG tank 122 is propane and how much (e.g., a percentage) of the LPG in the LPG tank 122 is butane.

The rail pressure control module 180 determines a target rail pressure based on the composition of the LPG. The target rail pressure corresponds to a rail pressure to maintain the LPG in the liquid form in the fuel rail 126 for provision to the engine 102. The rail pressure control module 180 controls the DC at which the LPG pump 124 operates based on the target rail pressure. In this manner, the rail pressure control module 180 operates the LPG pump 124 at less than a maximum DC at times when the LPG pump 124 can be operated at less than the maximum DC while still maintaining the LPG in the fuel rail 126 in the liquid form under all operating conditions.

Operating the LPG pump 124 at less than the maximum DC means that less heat is transferred from the LPG pump 124 to the LPG in the LPG tank 122 and to the LPG tank 122. Additionally, one or more engine operating parameters may be controlled based on the composition of the LPG in the LPG tank 122. For example only, a spark timing at which knock will occur may vary with the composition of the LPG. Accordingly, the spark timing may be set to avoid knock based on the composition of the LPG. While the rail pressure control module 180 is shown and described herein as being located within the ECM 150, the rail pressure control module 180 may be located in another suitable location and/or independently.

Figure 2:
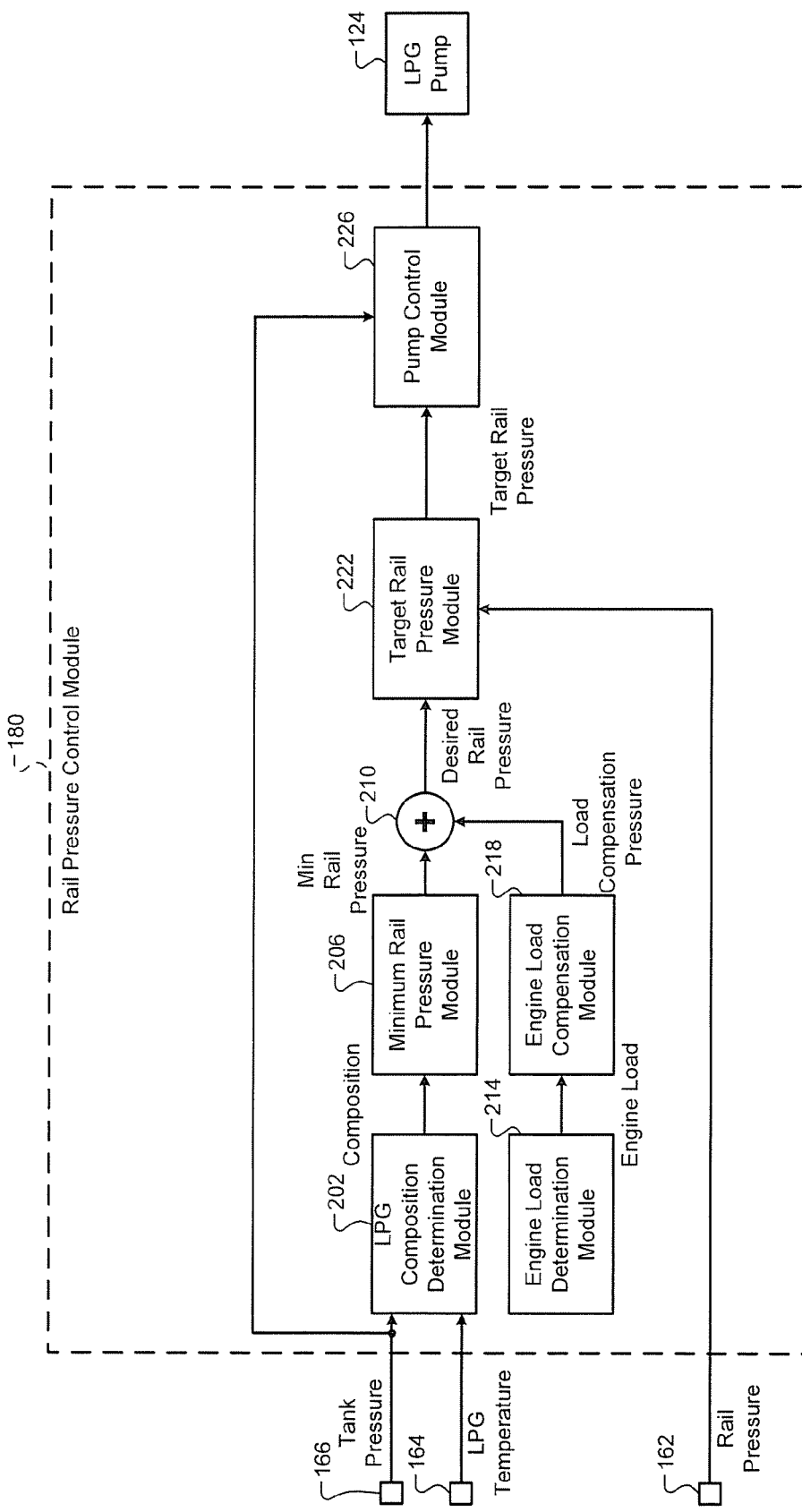
FIG. 2 is a functional block diagram of an exemplary rail pressure control system for an LPG vehicle according to the principles of the present disclosure.

Referring now to FIG. 2, a functional block diagram of an exemplary implementation of the rail pressure control module 180 is presented. The rail pressure control module 180 includes an LPG composition determination module 202, a minimum rail pressure module 206, a desired rail pressure module 210, an engine load determination module 214, and an engine load compensation module 218. The rail pressure control module 180 may also include a target rail pressure module 222 and a pump control module 226.

The LPG composition determination module 202 determines the composition of the LPG in the LPG tank 122 based on the tank pressure and the LPG temperature. For example only, the composition of the LPG may be expressed as a value between 1.0 and 0.0, where a value of 1.0 indicates that the LPG is 100% propane (and 0% butane) and value of 0.0 indicates that the LPG is 100% butane (and 0% propane). The tank pressure may be expressed as a gauge pressure (i.e., tank pressure—ambient pressure), as an absolute pressure (i.e., relative to ambient pressure), or in another suitable form. For example only, the LPG composition determination module 202 may determine the composition using one or more lookup tables populated based on vapor pressure curves for propane and butane, using a function that relates the tank pressure and LPG temperature to the composition and the vapor pressure curves, or in another suitable manner.

The minimum rail pressure module 206 determines a minimum rail pressure above which the LPG will be in the liquid form in the fuel rail 126. The minimum rail pressure module 206 determines the minimum rail pressure based on the composition of the LPG in the LPG tank 122. For example only, the minimum rail pressure module 206 may determine the minimum rail pressure using one or more lookup tables populated based on inverse vapor pressure curves for propane and butane, using a function that relates the composition to the minimum rail pressure, or in another suitable manner. The minimum rail pressure module 206 outputs the minimum rail pressure to the desired rail pressure module 210. The desired rail pressure module 210 is discussed further below.

The engine load determination module 214 determines an engine load. For example only, the engine load may refer to a relationship between the MAP and a maximum MAP achievable by the engine 102. For example only, the engine load may be expressed as a percentage using the equation:

$$\frac{\text{MAP}}{\text{Max MAP}} * 100,$$

where MAP is the MAP and Max MAP is the maximum MAP achievable by the engine 102. In various implementations, the engine load may be expressed in another suitable form and/or determined in another suitable manner.

The engine load compensation module 218 determines a load compensation pressure based on the engine load. The load compensation pressure may be used to offset an increase in the engine load, which may otherwise cause the rail pressure to decrease and cause the LPG in the fuel rail 126 to vaporize (i.e., transform into the vapor form). For example only, the engine load compensation module 218 may determine the load compensation pressure from a lookup table of load compensation pressure indexed by engine load, using a function that relates the engine load to the load compensation pressure, or in another suitable manner. The engine load compensation module 218 provides the engine load to the desired rail pressure module 210.

The desired rail pressure module 210 determines a desired rail pressure based on the minimum rail pressure and the load compensation pressure. More specifically, the desired rail pressure module 210 determines the desired rail pressure based on a sum of the minimum rail pressure and the load compensation pressure.

The target rail pressure module 222 determines a target rail pressure based on the desired rail pressure. The target rail pressure module 222 determines the target rail pressure further based on the rail pressure measured by the rail pressure sensor 162. For example only, the target rail pressure module 222 may employ an integral (i.e., I) control scheme and determine an integral pressure based on a difference between the desired rail pressure and the measured rail pressure. Alternatively, the target rail pressure module 222 may include a proportional-integral (PI), a proportional-integral-derivative (PID), fuzzy, or other suitable type of control system. The target rail pressure module 222 may set an integral gain used in determining the integral pressure and applying the integral control scheme based on the difference between the desired and measured rail pressures. The target rail pressure module 222 may set the target rail pressure equal to a sum of the desired rail pressure and the integral pressure.

The pump control module 226 controls the DC at which the LPG pump 124 operates based on the target rail pressure. The pump control module 226 may determine an absolute head pressure as a difference between the target rail pressure and the tank pressure. The pump control module 226 may determine a desired DC for the LPG pump 124 based on the absolute head pressure. The pump control module 226 may determine the desired DC further based on a voltage of an energy storage device (not shown), such as a battery, of the LPG vehicle. For example only, the pump control module 226 may determine the desired DC using one or more lookup tables that relate the voltage and the absolute head pressure to the desired DC, using a function that relates the voltage and the absolute head pressure to the desired DC, or in another suitable manner. The pump control module 226 may determine the desired DC further based on ambient temperature, altitude, and/or one or more other suitable inputs. The pump control module 226 operates the LPG pump 124 at the desired DC.

Figure 3:
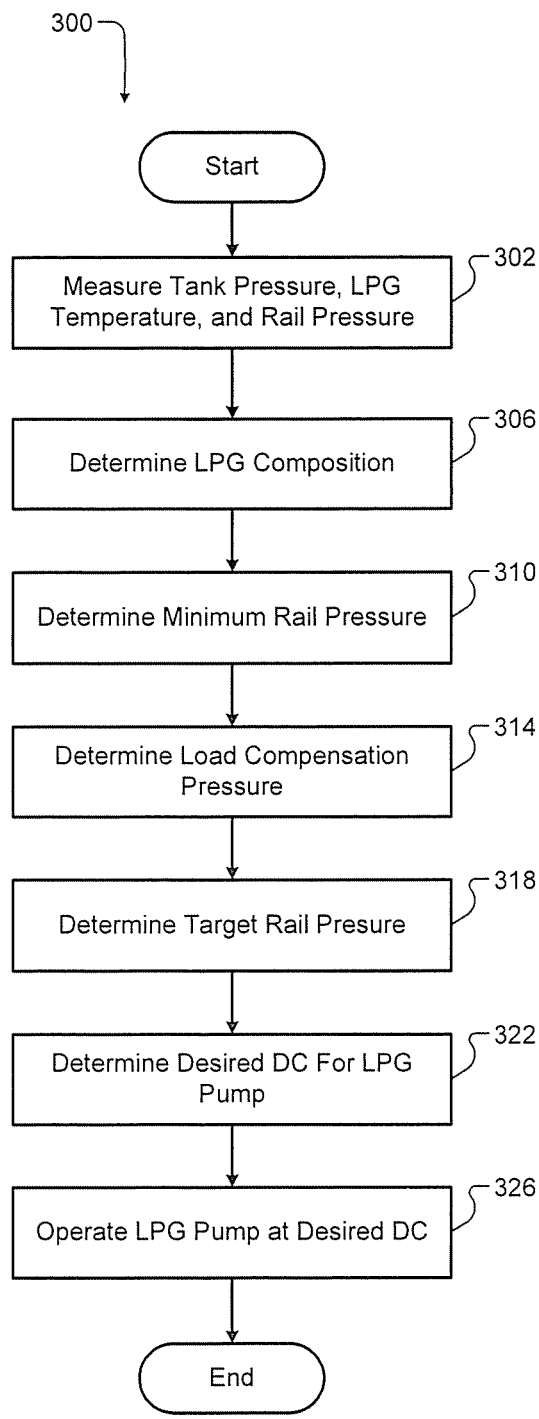
FIG. 3 is a flowchart depicting an exemplary method of determining composition of LPG in an LPG tank and controlling an LPG pump according to the principles of the present disclosure.

Referring now to FIG. 3, a flowchart depicting an exemplary method 300 of determining composition of the LPG in the LPG tank 122 and controlling the DC at which the LPG pump 124 operates is presented. Control may begin with 302 where control measures the tank pressure, the LPG temperature, and the rail pressure.

Control determines the composition of the LPG in the LPG tank 122 at 306. Control determines the composition of the LPG based on the tank pressure and the LPG temperature. Control determines the minimum rail pressure at 310 based on the composition of the LPG. Control determines the load composition pressure at 314, and control determines the target rail pressure based on the minimum rail pressure and the load compensation pressure at 318. For example only, control may determine the desired rail pressure based on the minimum rail pressure and the load compensation pressure, determine the integral pressure based on the desired rail pressure and the measured rail pressure, and set the target rail pressure equal to the sum of the desired rail pressure and the integral pressure.

At 322, control determines the desired DC for operating the LPG pump 124. Control determines the desired DC based on the target rail pressure. For example only, control may determine the absolute head pressure based on the difference between the tank pressure and the target rail pressure and determine the desired DC based on the absolute head pressure and the voltage of the energy storage device. Control operates the LPG pump 124 at the desired DC at 326. Control may then end. While control is shown as ending after 326, control may instead return to 302. In other words, the method 300 may be performed continuously during vehicle operation.

Figure 4:
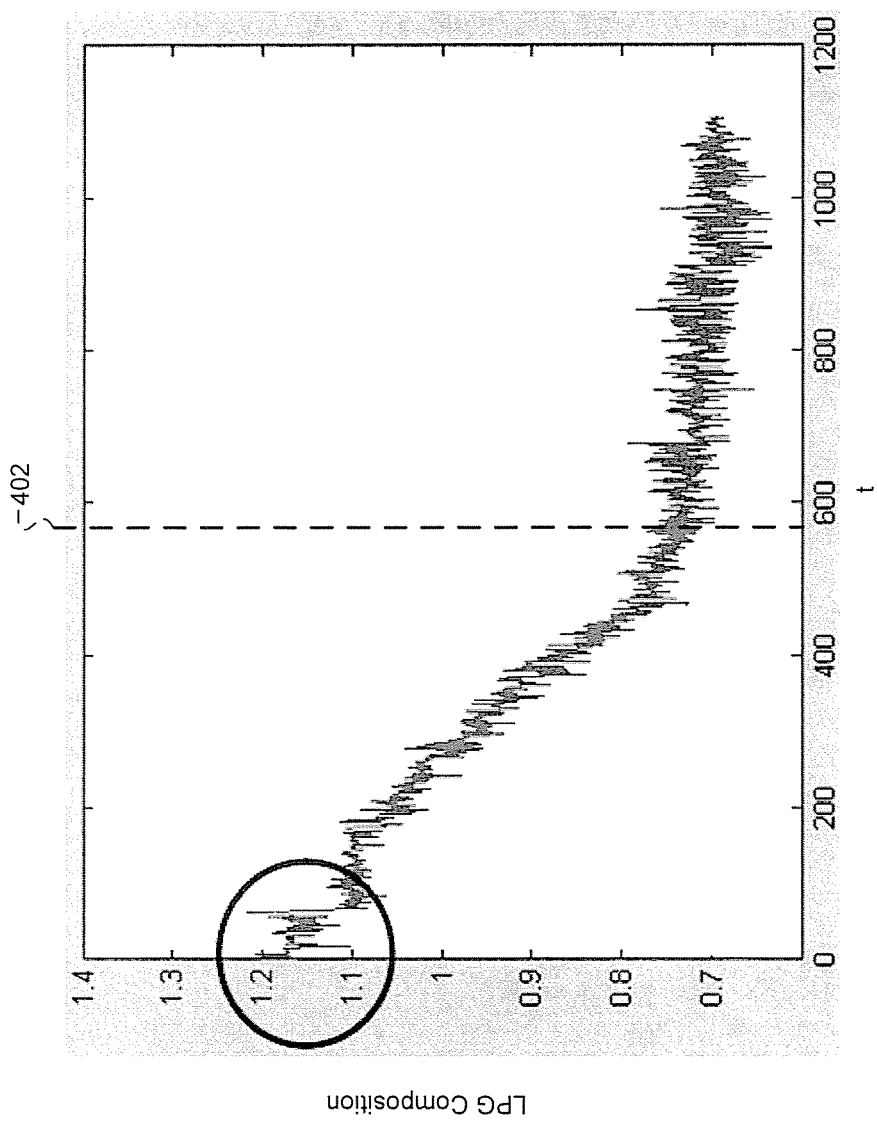
FIG. 4 is an exemplary graph of composition of LPG in an LPG tank versus time determined based on pressure measured within the LPG tank and temperature of the LPG according to the principles of the present disclosure.

Referring now to FIG. 4, an exemplary graph of LPG composition versus time is presented. Before time zero, the LPG tank 122 included 20L of LPG with a known composition of 100% propane. 20 L of LPG with a known composition of 50% propane and 50% butane was added (e.g., a partial refill event was performed). Accordingly, the composition of the LPG in the LPG tank after the addition should be approximately 70% propane and 30% butane. In implementations where the composition is expressed as a value between 1.0 and 0.0, inclusive, the composition of the LPG should be approximately 0.7.

At time zero, the LPG composition determination module 202 determines that the composition is approximately 1.2. This initial reading may be due to, for example, an increase in the tank pressure attributable to the addition, how the LPG temperature is measured, the non-mixture of the added LPG with the LPG that was already in the LPG tank 122, and/or other characteristics. However, after a predetermined adaption time, such as at approximately time 402, the LPG composition determination module 202 determines that the composition of the LPG in the LPG tank 122 is approximately 0.7. In this manner, the LPG composition determination module 202 reflects the expected composition of the LPG in the LPG tank 122. For example only, the predetermined adaption time may be approximately 80 seconds. The pump control module 226 may set the desired DC to the maximum DC or perform in another suitable manner for a predetermined period when a refill event occurs.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a liquefied petroleum gas (LPG) vehicle, comprising:
   a composition determination module that determines a composition of LPG in an LPG tank of the LPG vehicle based on an LPG tank pressure and a temperature of the LPG in the LPG tank;
   a target rail pressure module that determines a target rail pressure based on the composition of the LPG; and
   a pump control module that determines a duty cycle based on the target rail pressure and that controls operation of an LPG pump based on the duty cycle.

2. The control system of claim 1 wherein the composition corresponds to a first amount of the LPG that is propane and a second amount of the LPG that is butane.

3. The control system of claim 1 further comprising:
   a minimum rail pressure module that determines a minimum rail pressure based on the composition; and
   an engine load compensation module that determines a load compensation pressure based on an engine load,
   wherein the target rail pressure module determines the target rail pressure based on the minimum rail pressure and the load compensation pressure.

4. The control system of claim 3 wherein the target rail pressure module determines the target rail pressure based on a sum of the minimum rail pressure and the load compensation pressure.

5. The control system of claim 4 wherein the target rail pressure module determines an integral pressure based on a difference between the sum and a measured rail pressure and determines the target rail pressure based on the sum and the integral pressure.

6. The control system of claim 5 wherein the target rail pressure module sets the target rail pressure equal to a second sum of the integral pressure and the sum.

7. The control system of claim 3 wherein LPG in a fuel rail remains in a liquid form when a rail pressure is one of greater than and equal to the target rail pressure.

8. The control system of claim 1 wherein the pump control module determines a head pressure based on the LPG tank pressure and the target rail pressure and determines the duty cycle based on the head pressure.

9. The control system of claim 1 wherein the pump control module determines the duty cycle further based on at least one of a voltage of an energy storage device of the LPG vehicle, an altitude, and an ambient temperature.

10. A control method for a liquefied petroleum gas (LPG) vehicle, comprising:
   determining a composition of LPG in an LPG tank of the LPG vehicle based on an LPG tank pressure and a temperature of the LPG in the LPG tank;
   determining a target rail pressure based on the composition of the LPG;
   determining a duty cycle based on the target rail pressure; and
   controlling operation of an LPG pump based on the duty cycle.

11. The control method of claim 10 wherein the composition corresponds to a first amount of the LPG that is propane and a second amount of the LPG that is butane.

12. The control method of claim 10 further comprising:
   determining a minimum rail pressure based on the composition;
   determining a load compensation pressure based on an engine load; and
   determining the target rail pressure based on the minimum rail pressure and the load compensation pressure.

13. The control method of claim 12 further comprising determining the target rail pressure based on a sum of the minimum rail pressure and the load compensation pressure.

14. The control method of claim 13 further comprising:
   determining an integral pressure based on a difference between the sum and a measured rail pressure; and
   determining the target rail pressure based on the sum and the integral pressure.

15. The control method of claim 14 further comprising setting the target rail pressure equal to a second sum of the integral pressure and the sum.

16. The control method of claim 12 wherein LPG in a fuel rail remains in a liquid form when a rail pressure is one of greater than and equal to the target rail pressure.

17. The control method of claim 10 further comprising:
   determining a head pressure based on the LPG tank pressure and the target rail pressure; and
   determining the duty cycle based on the head pressure.

18. The control method of claim 10 further comprising determining the duty cycle further based on at least one of a voltage of an energy storage device of the LPG vehicle, an altitude, and an ambient temperature.

* * * * *